United States Patent
Min et al.

(10) Patent No.: US 11,143,909 B2
(45) Date of Patent: Oct. 12, 2021

(54) COLOUR CONVERSION FILM, AND BACK LIGHT UNIT AND DISPLAY DEVICE COMPRISING SAME

(71) Applicant: LG CHEM, LTD., Seoul (KR)

(72) Inventors: Sung Yong Min, Daejeon (KR); Dong Mok Shin, Daejeon (KR); Nari Kim, Daejeon (KR); Ji Ho Kim, Daejeon (KR); Hye Mi Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/966,627

(22) PCT Filed: Nov. 11, 2019

(86) PCT No.: PCT/KR2019/015238
§ 371 (c)(1),
(2) Date: Jul. 31, 2020

(87) PCT Pub. No.: WO2020/101299
PCT Pub. Date: May 22, 2020

(65) Prior Publication Data
US 2021/0033922 A1  Feb. 4, 2021

(30) Foreign Application Priority Data

Nov. 12, 2018 (KR) .................. 10-2018-0138417

(51) Int. Cl.
*G02F 1/13357* (2006.01)
*G02B 1/14* (2015.01)
(Continued)

(52) U.S. Cl.
CPC ........ *G02F 1/133602* (2013.01); *C09K 11/06* (2013.01); *G02B 1/14* (2015.01); *G02F 1/133516* (2013.01)

(58) Field of Classification Search
CPC ......... G02F 1/133602; G02F 1/133516; G02B 1/14; C09K 11/06
See application file for complete search history.

(56) References Cited

U.S. PATENT DOCUMENTS

| 10,927,293 | B2 | 2/2021 | Shin et al. |
| 2008/0055567 | A1* | 3/2008 | Sumiyama ............ H01S 5/4025 353/84 |

(Continued)

FOREIGN PATENT DOCUMENTS

| JP | 2010-079148 A | 4/2010 |
| JP | 2017-529405 A | 10/2017 |

(Continued)

OTHER PUBLICATIONS

International Search Report and Written Opinion issued for International Application No. PCT/KR2019/015238 dated Feb. 20, 2020, 6 pages.

(Continued)

*Primary Examiner* — Donald L Raleigh
(74) *Attorney, Agent, or Firm* — Rothwell, Figg, Ernst & Manbeck, P.C.

(57) ABSTRACT

A color conversion film having:
  a substrate film, a color conversion layer provided on the substrate film and
  a phase transformation adhesive layer including an adhesive resin matrix and a phase change material, and a backlight unit and a display apparatus including the color conversion film.

16 Claims, 3 Drawing Sheets

(51) Int. Cl.
    *C09K 11/06*     (2006.01)
    *G02F 1/1335*     (2006.01)

(56) References Cited

U.S. PATENT DOCUMENTS

| | | | |
|---|---|---|---|
| 2014/0037911 A1* | 2/2014 | Amano | C09J 7/29 |
| | | | 428/172 |
| 2016/0091640 A1 | 3/2016 | Wu et al. | |
| 2016/0161770 A1 | 6/2016 | Joo et al. | |
| 2016/0376458 A1 | 12/2016 | Kim | |
| 2017/0137540 A1 | 5/2017 | Shin et al. | |
| 2017/0152412 A1 | 6/2017 | Suzuki et al. | |
| 2017/0159910 A1 | 6/2017 | Seo et al. | |
| 2017/0210903 A1* | 7/2017 | Kawamitsu | H01L 31/028 |
| 2018/0046080 A1 | 2/2018 | Suzuki et al. | |
| 2018/0208838 A1 | 7/2018 | Sakaino et al. | |
| 2018/0246371 A1* | 8/2018 | Szwarcman | G02B 5/201 |
| 2019/0093008 A1 | 3/2019 | Shin et al. | |

FOREIGN PATENT DOCUMENTS

| | | | |
|---|---|---|---|
| JP | 2018-512614 A | 5/2018 | |
| KR | 2009-0060827 A | 6/2009 | |
| KR | 20090060827 A * | 6/2009 | C09K 11/06 |
| KR | 10-2011-0104382 A | 9/2011 | |
| KR | 2016-0070241 A | 6/2016 | |
| KR | 2016-0147645 A | 12/2016 | |
| KR | 2017-0001561 A | 1/2017 | |
| KR | 2017-0024908 A | 3/2017 | |
| KR | 2017-0067073 A | 6/2017 | |
| KR | 2018-0007870 A | 1/2018 | |
| KR | 10-1843854 B1 | 3/2018 | |
| KR | 2018-0061165 A | 6/2018 | |
| KR | 2018-0103326 A | 9/2018 | |
| TW | 201720892 A | 6/2017 | |
| TW | 201809212 A | 3/2018 | |
| WO | 2017-183854 A1 | 10/2017 | |

OTHER PUBLICATIONS

Fukano, "Thermal Accumulation Material for Textile," Venture Chemical Ltd., Technical leaflet of PCM, 2011, 1-12.

Karaman, et al., "Polyethylene glycol (PEG)/diatomite composite as a novel form-stable phase change material for thermal energy storage", Solar Energy Materials and Solar Cells, 95, 2011, 1647-1653.

* cited by examiner

[FIG. 1]
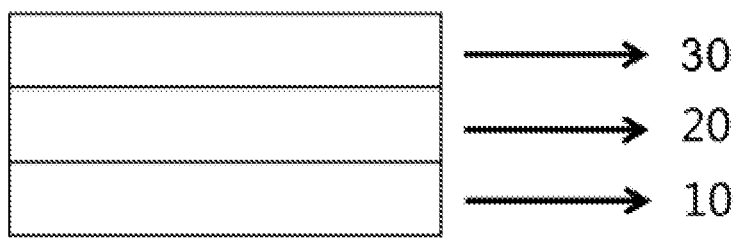
[FIG. 2]
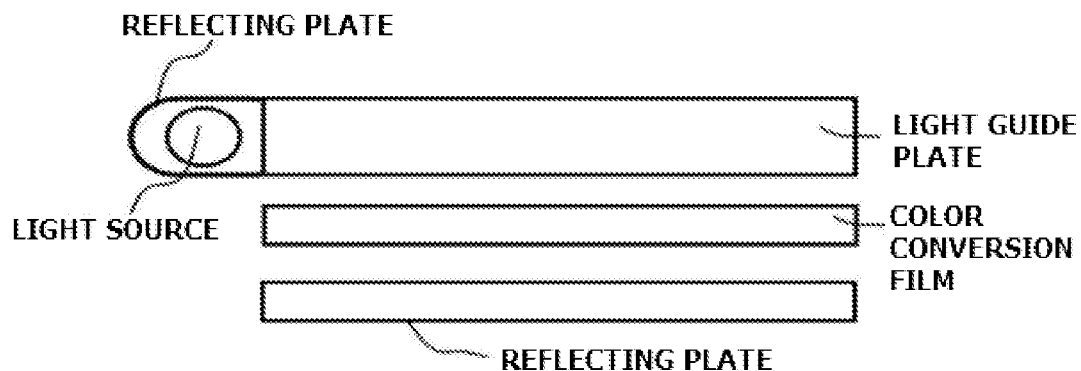
[FIG. 3]
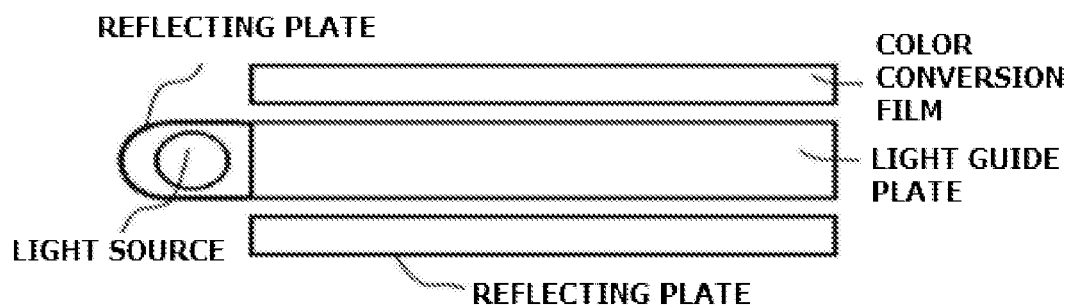

[FIG. 4]
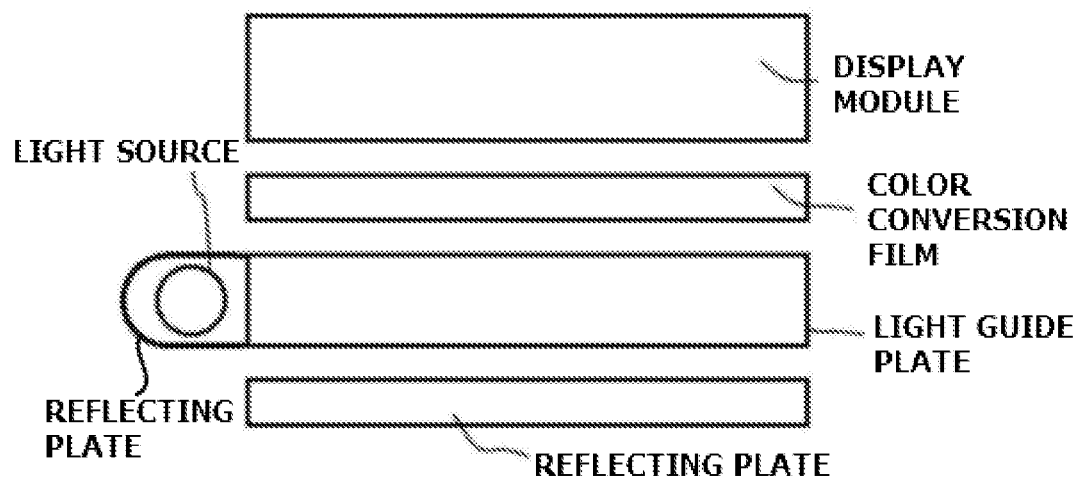
[FIG. 5]
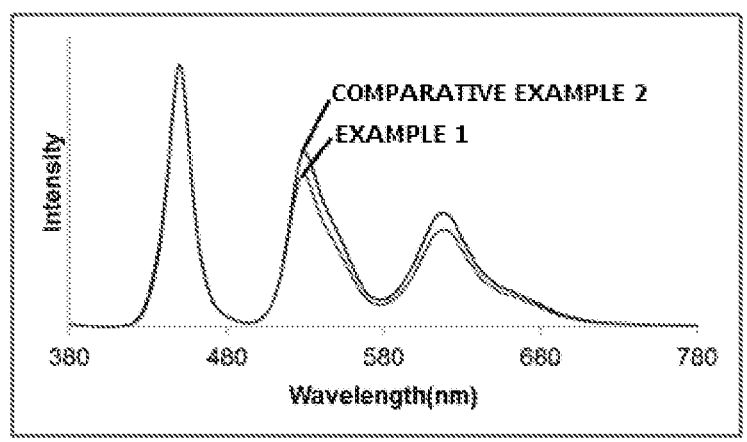

[FIG. 6]
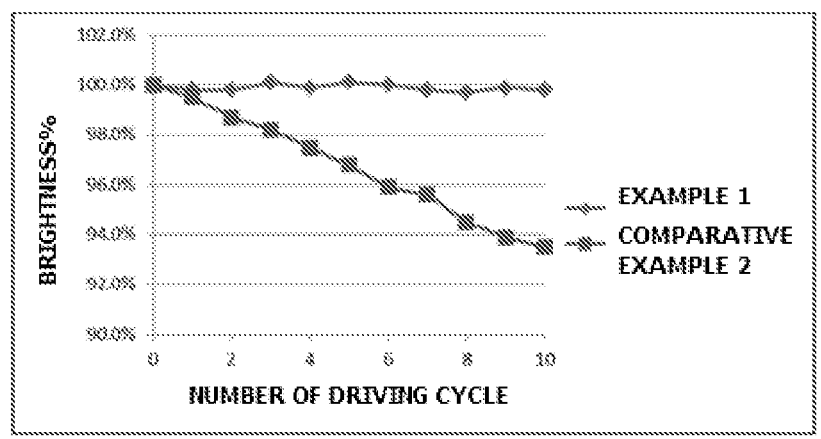

COLOUR CONVERSION FILM, AND BACK LIGHT UNIT AND DISPLAY DEVICE COMPRISING SAME

The application is a 35 U.S.C. 371 National Phase Entry Application from PCT/KR2019/015238 filed on Nov. 11, 2019, designating the United States, which claims priority to and the benefits of Korean Patent Application No. 10-2018-0138417, filed with the Korean Intellectual Property Office on Nov. 12, 2018, the entire contents of which are incorporated herein by reference.

The present specification relates to a color conversion film, and a backlight unit and a display apparatus including the same.

BACKGROUND ART

Development of a color conversion film using various materials has been progressed recently for improving color gamut of LCD displays such as TVs.

A color conversion film generally has a problem of reducing durability by accelerating degradation due to heat, oxygen or the like together with light. Accordingly, there have been demands for material selection and structure improvements capable of reducing their effects.

Particularly, enhancing heat resistance properties is essential in a color conversion film due to its inevitable exposure to the heat of a backlight and the like generated during display driving.

There have been attempts in the art to enhance thermal stability through substituting a functional group of a fluorescent substance, introducing a resin with high heat resistance, and the like, however, enhancing heat resistance has been limited since heat transfer to a color conversion layer itself has not been prevented. Accordingly, new technologies capable of preventing film degradation caused by heat have been required.

BRIEF DESCRIPTION OF THE INVENTION

The present specification provides a color conversion film, and a backlight unit and a display apparatus including the same.

One embodiment of the present specification provides a color conversion film including a substrate film; a color conversion layer provided on the substrate film; and a phase transformation adhesive layer provided on the color conversion layer, wherein the phase transformation adhesive layer includes an adhesive resin matrix and a phase change material, and the phase change material is at least one selected from the group consisting of an organic monomer, a polymer and an inorganic salt hydrate.

Another embodiment of the present specification provides a method for preparing a color conversion film, the method including preparing a substrate film; forming a color conversion layer on the substrate film; and forming a phase transformation adhesive layer including an adhesive resin matrix and a phase change material on the color conversion layer, wherein the phase change material is at least one selected from the group consisting of an organic monomer, a polymer and an inorganic salt hydrate.

Another embodiment of the present specification provides a backlight unit including the color conversion film described above.

Another embodiment of the present specification provides a display apparatus including the backlight unit described above.

Advantageous Effects

In a color conversion film according to one embodiment of the present specification, heat generated during display driving is absorbed by a phase change material in a phase transformation adhesive layer, and therefore, degradation of the color conversion film caused by heat can be reduced.

In addition, the color conversion film according to one embodiment of the present specification includes a phase change material in a layer separate from a color conversion layer, and therefore, changes in the volume that may occur during the phase transition or leakage of the phase change material can be minimized.

BRIEF DESCRIPTION OF DRAWINGS

FIG. 1 is a mimetic diagram of a color conversion film according to one embodiment of the present specification.

FIGS. 2 and 3 are mimetic diagrams illustrating structures of a backlight unit according to one embodiment of the present specification.

FIG. 4 is a mimetic diagram illustrating a structure of a display apparatus according to one embodiment of the present specification.

FIG. 5 is a graph showing brightness spectra of a color conversion film according to one embodiment of the present specification and a film of a comparative example.

FIG. 6 is a graph evaluating repeated driving durability of color conversion films prepared according to an example and a comparative example according to one embodiment of the present specification.

REFERENCE NUMERAL

10: Substrate Film
20: Color Conversion Layer
30: Phase Transformation Adhesive Layer

DETAILED DESCRIPTION OF THE INVENTION

Hereinafter, the present specification will be described in more detail.

In the present specification, a description of one member being placed "on" another member includes not only a case of the one member being in contact with the another member but a case of still another member being present between the two members.

In the present specification, a description of a certain part "including" certain constituents means capable of further including other constituents, and does not exclude other constituents unless particularly stated on the contrary.

One embodiment of the present specification provides a color conversion film including a substrate film; a color conversion layer provided on the substrate film; and a phase transformation adhesive layer provided on the color conversion layer, wherein the phase transformation adhesive layer includes an adhesive resin matrix and a phase change material, and the phase change material is at least one selected from the group consisting of an organic monomer, a polymer and an inorganic salt hydrate.

The phase change material absorbs heat by causing a phase transition in a certain temperature range, and through such heat absorption, heat transfer to the color conversion layer may be prevented. Specifically, the phase change material may cause a solid-liquid phase transition at 30° C. to 80° C. When a phase transition occurs at a temperature of lower than 30° C., an effect of stabilization obtained by heat absorption may not be significant in a driving temperature range of the color conversion film, and when a phase transition occurs at a temperature of higher than 80° C., a heat absorbing ability of the phase change material is reduced causing degradation by transferring much heat to the color conversion layer.

According to one embodiment of the present specification, the phase transformation adhesive layer may be formed with a phase change material and an adhesive material. The adhesive material is not particularly limited as long as it may be commonly used in an adhesive layer.

According to one embodiment of the present specification, the content of the phase change material may be from 10 parts by weight to 80 parts by weight with respect to 100 parts by weight of the phase transformation adhesive layer. When introducing a content of less than 10 parts by weight, a heat absorbing ability of the phase transformation adhesive layer is reduced resulting in an insignificant durability enhancing effect, and when introducing a content of greater than 80 parts by weight, viscosity of the coating solution decreases declining processability.

According to one embodiment of the present specification, the content of the phase change material may be greater than or equal to 5 parts by weight and less than or equal to 100 parts by weight with respect to 100 parts by weight of the adhesive resin matrix. Specifically, the content may be 5 parts by weight or greater, 10 parts by weight or greater, 15 parts by weight or greater, 20 parts by weight or greater, 25 parts by weight or greater, 30 parts by weight or greater, 35 parts by weight or greater, 40 parts by weight or greater, 45 parts by weight or greater or 50 parts by weight or greater, and may be 95 parts by weight or less, 90 parts by weight or less, 85 parts by weight or less, 80 parts by weight or less, 75 parts by weight or less or 70 parts by weight or less.

According to one embodiment of the present specification, the phase change material has a microcapsule structure, and the microcapsule structure may include a shell and a core.

In addition, according to one embodiment of the present specification, the shell may be at least one selected from the group consisting of urea-formaldehyde, melamine-formaldehyde, a polyurethane resin, a polyurea resin, an epoxy resin, gelatin and a polyacrylic resin, and the core may be at least one selected from the group consisting of an organic monomer, a polymer and an inorganic salt hydrate.

According to one embodiment of the present specification, the organic monomer may be at least one selected from the group consisting of a paraffin-based compound, a fatty acid-based compound, an alcohol-based compound and a carbonate-based compound.

The paraffin-based compound is not particularly limited, but may be at least one selected form the group consisting of n-nonadecane, n-eicosane, n-heneicosane, n-docosane, n-tricosane, n-tetracosane, n-pentacosane, n-hexacosane, n-heptacosane and n-octacosane.

The fatty acid-based compound is not particularly limited, but may be at least one selected form the group consisting of capric acid, lauric acid and myristic acid.

The alcohol-based compound is not particularly limited, but may be at least one selected form the group consisting of 1-dodecanol and 1-tetradecanol.

The carbonate-based compound is not particularly limited, but may be at least one selected form the group consisting of tetradecyl carbonate, hexadecyl carbonate and octadecyl carbonate.

According to one embodiment of the present specification, the polymer may be at least one selected form the group consisting of poly(ethylene glycol), poly(propylene oxide) (PPO) and polytetrahydrofuran (PTHF).

According to one embodiment of the present specification, the inorganic salt hydrate may be at least one selected form the group consisting of $LiNO_3.3H_2O$, $Na_2SO_4.10H_2O$, $NaCH_3COO.3H_2O$, $CaBr_2.6H_2O$, $Na_2HPO_4.12H_2O$, $Zn(NO_3)_2.nH_2O$, $Na_2S_2O_3.5H_2O$ and $Cd(NO_3)_2.4H_2O$.

In one embodiment of the present specification, as components forming the adhesive resin matrix, adhesive components known in the art may be used. For example, the adhesive resin matrix may be a cation polymerizable adhesive component, a radical curable adhesive component, or a mixture thereof.

In one embodiment of the present specification, the adhesive resin matrix includes a cation polymerizable adhesive component.

The cation polymerizable adhesive component includes an adhesive component cured by a cation polymerization reaction, and may be formed using cation polymerizable compositions known in the art.

In one embodiment of the present specification, the cation polymerizable composition includes a cationic photopolymerization initiator. The cationic photopolymerization initiator is a compound producing cation species or Lewis acids by active energy ray irradiation, and examples thereof may include, but are not limited to, aromatic diazonium salts, aromatic iodine aluminum salts, onium salts such as aromatic sulfonium salts, iron-arene complexes and the like.

Components other than the cationic photopolymerization initiator in the cation polymerizable composition are not particularly limited. For example, in the cation polymerizable composition, a cation polymerizable compound such as an epoxy compound, and, as necessary, a binder resin, a reactive resin, additives and the like may be further used. For example, the cation polymerizable composition includes, based on 100 parts by weight of the composition, the cation polymerizable compound (for example, epoxy compound) in 5 parts by weight to 90 parts by weight; and the cationic photopolymerization initiator in 0.5 parts by weight to 20 parts by weight, and as necessary, may further include additives for maintaining viscosity or for enhancing wetting.

In one embodiment of the present specification, the cation polymerizable composition may include a resin, a cationic photoinitiator and a tackifier. As the resin, rubber-based resins may be used. The content of the cationic photopolymerization initiator may be determined as necessary, and for example, may be from 30 parts by weight to 100 parts by weight with respect to 100 parts by weight of the resin. The tackifier may be included in 30 parts by weight to 40 parts by weight with respect to 100 parts by weight of the resin. In addition, additives known in the art may be further added as necessary.

In one embodiment of the present specification, the cation polymerizable adhesive component preferably does not include materials additionally generating radicals during UV irradiation.

In one embodiment of the present specification, the adhesive color conversion layer may be formed by coating a cation polymerizable composition; and an organic fluorescent substance on a substrate, and cation polymerizing the result.

In one embodiment of the present specification, the adhesive resin matrix includes a radical curable adhesive component. The radical curable adhesive component includes an adhesive component cured by radical curing, and may be formed using a radical curable composition known in the art. The radical curable composition includes a radical polymerizable compound and a radical initiator, and as necessary, may further include a rubber-based gluing resin and the like. The composition may include a solvent as necessary, however, a separate solvent may not be used when the composition including a radical polymerizable compound and a radical initiator is in a solution state.

The radical polymerizable compound is a compound polymerized through a radical polymerization reaction, and may use a radical polymerizable monomer or polymer. As the radical polymerizable compound, polyisocyanate having two or more isocyanate groups in the molecule, urethane acrylate reacting hydroxyalkyl (meth)acrylate, (meth)acrylates having one or more (meth)acryloyl groups in the molecule, (meth)acrylamides, maleimides, (meth)acrylic acid, maleic acid, itaconic acid, (meth)acrylaldehyde, (meth)acryloylmorpholine, N-vinyl-2-pyrrolidone or triallyl isocyanurate and the like may be used.

The radical initiator may be used to facilitate polymerization of the radical polymerizable compound and enhance a curing rate. Types of the radical initiator may include an acetophenone-based photopolymerization initiator, a benzoin ether-based photopolymerization initiator, a benzophenone-based photopolymerization initiator, a thioxanthone-based photopolymerization initiator and the like, but are not limited thereto. As necessary, the radical curable composition may further include additional additives. Examples of the additive may include an antioxidant, an oligomer, an adhesion promotor and the like, but are not limited thereto.

In one embodiment of the present specification, the radical polymerizable compound may be included in 80 parts by weight to 99.5 parts by weight and the radical initiator may be included in 0.5 parts by weight to 20 parts by weight with respect to 100 parts by weight of the radical curable composition.

In one embodiment of the present specification, the radical curable adhesive component may use a radical polymerizable compound having a weight average molecular weight of 300 g/mol or greater so as to prevent the effects of radicals, which are generated while curing the radical curable composition, on the organic fluorescent substance.

The radical polymerizable compound having a weight average molecular weight of 300 g/mol or greater may be a monomer, a polymer, or a mixture thereof. By having a relatively large molecular weight, the radical polymerizable monomer or polymer having a weight average molecular weight of 300 g/mol or greater does not react with the organic fluorescent substance even when radicals are generated after UV curing, and optical properties of the color conversion film may not decline. Herein, it is the radical polymerizable compound that has a weight average molecular weight of 300 g/mol or greater, and other components not affecting the properties of the organic fluorescent substance are not limited in the weight average molecular weight.

According to one embodiment of the present specification, a protective film may be further included on the phase transformation adhesive layer.

FIG. 1 illustrates a color conversion film according to one embodiment of the present specification. Specifically, FIG. 1 illustrates a color conversion film in which a color conversion layer (20) is coated on a substrate film (10), and a phase transformation adhesive layer (30) is coated thereon.

In one embodiment of the present specification, the resin includes both a thermoplastic resin and a thermocurable resin, and although not particularly limited in the type, poly(meth)acryl-based such as polymethyl methacrylate (PMMA), polycarbonate-based (PC), polystyrene-based (PS), polyethylene-based, polyethylene glycol-based, polyarylene-based (PAR), polyurethane-based (TPU), styrene-acrylonitrile-based (SAN), polyvinylidene fluoride-based (PVDF), modified polyvinylidene fluoride-based (modified-PVDF) and the like may be used.

In one embodiment of the present specification, the resin may exhibit transparent properties. Herein, being transparent means visible light transmittance being 75% or higher.

In one embodiment of the present specification, the solvent may be dimethylformamide, N,N-dimethylacetamide, pyridine, 2-methylpyridine, 4-methylpyridine, butyl acetate, n-propyl acetate, ethyl acetate, xylene, toluene, cyclohexanone, methyl ethyl ketone, methyl isobutyl ketone or a combination thereof. More specifically, as the solvent, the above-described solvents may be used either alone or as a mixture of two types.

In one embodiment of the present specification, the organic fluorescent dye absorbs light selected in a near-ultraviolet to visible region, and dyes emitting light having a different wavelength from the absorbing light may be used.

In one embodiment of the present specification, the organic fluorescent dye includes any one or more of BODIPY-based, acridine-based, xanthene-based, arylmethane-based, coumarin-based, polycyclic aromatic hydrocarbon-based, polycyclic hetero aromatic-based, perylene-based, pyrrole-based and pyrene-based derivatives. Specifically, the organic fluorescent dye includes one or two types of the above-described materials. More specifically, the organic fluorescent dye uses a BODIPY-based organic fluorescent dye.

In one embodiment of the present specification, the organic fluorescent dye has a molecular absorption coefficient of 50,000 $M^{-1}$ $cm^{-1}$ to 150,000 $M^{-1}$ $cm^{-1}$.

In one embodiment of the present specification, the substrate film may have a thickness of 1 µm to 100 µm. More specifically, the thickness may be from 10 µm to 90 µm, and preferably from 20 µm to 80 µm.

In one embodiment of the present specification, the organic fluorescent dye is present in a form dispersed into the resin.

The content of the organic fluorescent dye is from 0.005 parts by weight to 2 parts by weight based on 100 parts by weight of the resin.

In one embodiment of the present specification, the color conversion film according to the embodiments described above additionally includes light diffusing particles. By dispersing light diffusing particles into the color conversion film instead of a light diffusing film having been used in the art to enhance brightness, higher brightness may be obtained compared to using a separate light diffusing film, and an adhering process may be skipped as well.

As the light diffusing particles, particles having a high refractive index than the resin may be used, and examples thereof may include air or other gases, air- or gas-filled hollow beads or particles (for example, air/gas-filled glass or polymers) including $TiO_2$, silica, borosilicate, alumina, or sapphire; polymer particles including polystyrene, polycarbonate, polymethyl methacrylate, acryl, methyl methacrylate, styrene, melamine resin, formaldehyde resin, or melamine and formaldehyde resins; or combinations thereof.

The light diffusing particles may have a particle diameter in a range of 0.1 µm to 5 µm. The content of the light diffusing particles may be determined as necessary, and for example, may be from approximately 1 parts by weight to 30 parts by weight with respect to 100 parts by weight of the resin solid content.

In one embodiment of the present specification, the color conversion film has a thickness of 2 μm to 200 μm.

In one embodiment of the present specification, the color conversion film may exhibit high brightness even with a small thickness of 2 μm to 20 μm. This is due to the fact that the content of the fluorescent substance molecules included in the unit volume is higher than the content of quantum dots. For example, a color conversion film having a 5 μm thickness using an organic fluorescent dye content of 0.5 wt % with respect to the resin solid content may exhibit high brightness of 4000 nit or greater based on the brightness of 600 nit of a blue backlight unit (blue BLU).

In one embodiment of the present specification, the color conversion film includes a substrate film; and a color conversion layer provided on the substrate film.

In one embodiment of the present specification, the substrate film may function as a support when preparing the color conversion film. The substrate film is not limited in the type or thickness as long as it is transparent and capable of functioning as a support, and those known in the art may be used. Herein, being transparent means visible light transmittance being 70% or higher. For example, a PET film may be used as the substrate film.

As necessary, the substrate film may be replaced by a barrier film, or a bather film may be provided on one surface or both surfaces of the substrate film.

The barrier film is not particularly limited as long as it is capable of blocking moisture or oxygen, and those known in the art may be used. For example, the barrier film includes a bather layer having transmittance of $10^{-1}$ cc/m$^2$/day for at least one of moisture and oxygen. For example, the bather layer may include aluminum oxides or nitrides, and ionic metal oxides providing moisture or oxygen barrier properties. The barrier film may further include a buffer layer formed with one or more types selected from among sol-gel-based, acryl-based, epoxy-based and urethane-based coating solution compositions.

As one example, the barrier film may include an organic-inorganic hybrid coating layer, an inorganic material layer, and a protective coating layer including inorganic nanoparticles of which surfaces are modified with organosilane provided on one surface or both surfaces of the substrate film. Herein, the inorganic material layer may be formed with metal oxides or nitrides. The inorganic nanoparticles may be nanoparticles of alumina, silica, zinc oxide, antimony oxide, titanium oxide or zirconium oxide. The organic-inorganic hybrid coating layer may be formed by curing an organosilane-including coating composition in a sol state by heat or UV, and the coating solution composition in a sol state may include proper additive, solvent, polymerization catalyst and the like together with organosilane.

In one embodiment of the present specification, an adhesive or gluing layer may be provided on one surface of the color conversion film. Specifically, an adhesive or gluing layer may be provided on one surface of the color conversion layer not provided with the substrate film. As components forming the adhesive or gluing layer, those used in the art may be used without limit.

Another embodiment of the present specification provides a method for preparing a color conversion film, the method including preparing a substrate film; forming a color conversion layer on the substrate film; and forming a phase transformation adhesive layer including an adhesive resin matrix and a phase change material on the color conversion layer, wherein the phase change material is at least one selected from the group consisting of an organic monomer, a polymer and an inorganic salt hydrate.

In one embodiment of the present specification, the forming of a color conversion layer may include preparing a resin solution in which a resin, a solvent and an organic fluorescent dye are mixed; forming a color conversion layer by coating the resin solution on the substrate film; and drying the color conversion layer coated on the substrate film.

In one embodiment of the present specification, the forming of a phase transformation adhesive layer may include forming a phase transformation adhesive layer by coating a phase change solution including an adhesive resin matrix, a solvent and a phase change material on the color conversion layer; and thermally curing or photocuring the phase transformation adhesive layer.

One embodiment of the present specification provides a method for preparing a color conversion film, the method including preparing a substrate film; preparing a resin solution in which a resin, a solvent and an organic fluorescent dye are mixed; forming a color conversion layer by coating the resin solution on the substrate film; drying the color conversion layer coated on the substrate film; forming a phase transformation adhesive layer by coating a phase change solution including an adhesive resin matrix, a solvent and a phase change material on the dried color conversion layer; and thermally curing or photocuring the phase transformation adhesive layer.

In one embodiment of the present specification, the preparing of a substrate film may be preparing a substrate film through extrusion or coating, or preparing by purchasing a commercially-available substrate film.

In the resin solution, the above-described organic fluorescent dye is dissolved, and therefore, the organic fluorescent dye is homogeneously distributed in the solution. This is different from a quantum dot film preparation process requiring a separate dispersion process.

In one embodiment of the present specification, the organic fluorescent dye-dissolved resin solution is not particularly limited in the preparation method as long as the organic fluorescent dye and the resin described above are dissolved in the solution.

According to one example, the organic fluorescent dye-dissolved resin solution may be prepared using a method of preparing a first solution by dissolving an organic fluorescent dye in a solvent, preparing a second solution by dissolving a resin in a solvent, and mixing the first solution and the second solution. When mixing the first solution and the second solution, it is preferred that these be homogeneously mixed. However, the method is not limited thereto, and a method of simultaneously adding and dissolving an organic fluorescent dye and a resin in a solvent, a method of dissolving an organic fluorescent dye in a solvent and subsequently adding and dissolving a resin, a method of dissolving a resin in a solvent and then subsequently adding and dissolving an organic fluorescent dye, and the like, may be used.

The organic fluorescent dye included in the solution is the same as described above. In one embodiment of the present specification, instead of the resin included in the resin included in the solution, a monomer curable by a thermoplastic resin; or a mixture of a thermoplastic resin and a monomer curable by a thermoplastic resin. For example, the monomer curable by a thermoplastic resin includes a (meth) acryl-based monomer, and this may be formed as a resin matrix material by UV curing. When using such a curable monomer, an initiator required for curing may be further added as necessary.

When using the first solution and the second solution, solvents included in each of these solutions may be the same as or different from each other. Even when different types of solvents are used in the first solution and the second solution, these solvents preferably have compatibility so as to be mixed with each other.

Types of the solvent included in the solution are the same as above.

In one embodiment of the present specification, when using the monomer curable by a thermoplastic resin as the resin included in the solution, curing, for example, UV curing may be conducted before the drying or at the same time as the drying.

When filming an organic fluorescent dye by extruding with a resin, extrusion methods known in the art may be used, and for example, the color conversion layer may be prepared by extruding the organic fluorescent dye with a resin such as polycarbonate-based (PC), poly(meth)acryl-based or styrene-acrylonitrile-based (SAN).

In one embodiment of the present specification, an adhesive or gluing layer may be formed on the color conversion layer prepared as above. The adhesive or gluing layer may be formed by coating a composition for forming an adhesive or gluing layer, and then polymerizing or curing the result, or may also be formed by attaching an adhesive or gluing sheet on the color conversion layer. The adhesive or gluing sheet may be polymerized or cured after being attached to the color conversion layer, but may also be polymerized or cured before the attachment as necessary. As the curing, UV curing may be used. The curing condition may be determined depending on the components and the composition ratio of the composition.

In the present specification, the "curing" means a process of being converted to a state capable of obtaining adhesion by a chemical or physical action or reaction of components included in the phase transformation adhesive layer by being exposed to heat and/or light. For example, the phase transformation adhesive layer is present in a liquid state before curing, and may be converted to a solid state after curing.

In one embodiment of the present specification, the light diffusing particles may be dispersed into the adhesive or gluing layer by dispersing the light diffusing particles to the composition for forming an adhesive or gluing layer. Herein, the light diffusing particles may be directly dispersed to the composition for forming an adhesive or gluing layer, or a dispersion solution in which the light diffusing particles are dispersed to a separate solvent may be mixed with the composition for forming an adhesive or gluing layer to increase a degree of dispersion of the light diffusing particles. As necessary, a sonicator or a shaker may be used to disperse the light diffusing particles into a solvent.

Another embodiment of the present specification provides a backlight unit including the color conversion film described above. The backlight unit may have backlight unit constitutions known in the art except for including the color conversion film.

FIG. 2 and FIG. 3 illustrate structures of the backlight unit according to one embodiment of the present specification. According to FIG. 2, the color conversion film according to the embodiments described above is provided between a light guide plate and a reflecting plate. According to FIG. 3, the color conversion film according to the embodiments described above is provided on a surface opposite to a surface facing a reflecting plate of a light guide plate. FIGS. 2 and 3 illustrate a constitution including a light source and a reflecting plate surrounding the light source, however, the constitution is not limited to such a structure, and may vary depending on the backlight unit structure known in the art. In addition, as the light source, a direct type as well as a side chain type may be used, and the reflecting plate or the reflective layer may not be included or may be replaced with other constituents as necessary.

Another embodiment of the present specification provides a display apparatus including the backlight unit described above. For example, the display apparatus includes a display module and a backlight unit FIG. 4 illustrates a structure of the display apparatus according to one embodiment of the present specification. According to FIG. 4, the color conversion film according to the embodiments described above is provided on a surface opposite to a surface facing a reflecting plate of a light guide plate, and a display module is provided on the top of the color conversion film. However, the structure of the display apparatus is not limited thereto, and the structure is not particularly limited as long as it includes the backlight unit described above as a constituent. As necessary, additional films such as a light diffusing film, a light concentrating film and a brightness enhancing film may be further provided between the display module and the backlight unit.

The display apparatus is not particularly limited, and may be, for example, a TV, a computer monitor, a laptop, a mobile phone and the like.

Hereinafter, the present specification will be described in detail with reference to examples. However, the examples according to the present specification may be modified to various other forms, and the scope of the present application is not to be construed as being limited to the examples described below. Examples of the present specification are provided in order to more fully describe the present specification to those having average knowledge in the art.

Example 1

A first solution was prepared by dissolving an acrylate-based adhesive in a xylene solvent, and adding a curing initiator thereto. A phase change material (poly(ethylene glycol), PEG) was dissolved in a xylene solvent to prepare a second solution. An adhesive solution was prepared by homogeneously mixing the first solution and the second solution so that, with respect to 100 parts by weight of the acrylate-based adhesive, the content of the phase change material was 70 parts by weight. This adhesive solution was coated on a protective film, and thermally cured to prepare a phase transformation adhesive layer.

A green fluorescent substance and a red fluorescent substance of the following structural formulae were dissolved in a molar ratio of 50:1 in a xylene solvent to prepare a third solution.

<Green Fluorescent Substance>

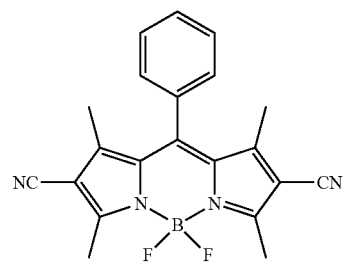

-continued

<Red Fluorescent Substance>

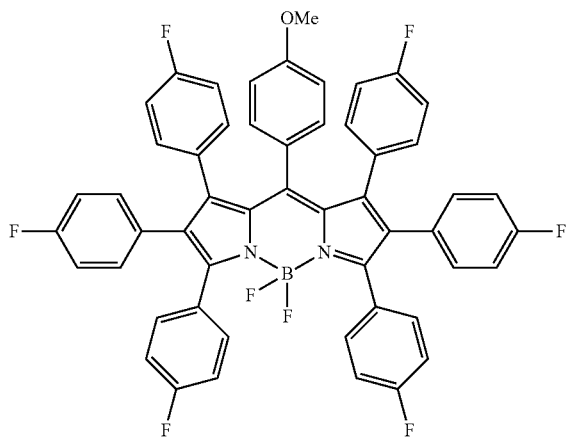

A thermoplastic resin (PMMA) was dissolved in a xylene solvent to prepare a fourth solution. The third solution and the fourth solution were homogeneously mixed so that, with respect to 100 parts by weight of the thermoplastic resin, the content of the green and red fluorescent substances was 0.45 parts by weight, and the content of $TiO_2$ particles was 10 parts by weight. This solution was coated on a PET substrate, and then dried to prepare a color conversion layer. Herein, the $TiO_2$ particles may be added and mixed to any one of the third and the fourth solutions, or a fifth solution including the $TiO_2$ particles may be prepared, or the $TiO_2$ particles may be introduced when mixing the third and the fourth solutions.

The phase transformation adhesive layer was laminated on the color conversion layer side to prepare a color conversion film.

Example 2

A color conversion film was prepared in the same manner as in Example 1 except that, as the phase change material, a microcapsule phase change material (Mild Riken Industrial Co., Ltd., PMCD-32SP) was used so that the content was 70 parts by weight with respect to 100 parts by weight of the acrylate-based adhesive.

Comparative Example 1

An adhesive solution was prepared by dissolving 17 parts by weight of an acrylate-based adhesive in xylene, and adding a curing initiator thereto. This adhesive solution was coated on a protective film, and thermally cured to prepare an adhesive layer.

A first solution was prepared by dissolving the same green and red fluorescent substances as in Example 1 in a xylene solvent in a molar ratio of 50:1.

A thermoplastic resin (PMMA) was dissolved in a xylene solvent to prepare a second solution. A powder-type phase change material (poly(ethylene glycol), PEG) was dissolved in a xylene solvent to prepare a third solution. The first solution, the second solution and the third solution were homogeneously mixed so that, with respect to 100 parts by weight of the thermoplastic resin, the content of the green and red fluorescent substances was 0.45 parts by weight, the content of the phase change material was 70 parts by weight, and the content of $TiO_2$ particles was 10 parts by weight. This solution was coated on a PET substrate, and then dried to prepare a color conversion layer. Herein, the $TiO_2$ particles may be added and mixed to any one of the first to the third solutions, or a fourth solution including the $TiO_2$ particles may be prepared, or the $TiO_2$ particles may be introduced when mixing the first to the third solutions.

The adhesive layer was laminated on the color conversion layer side to prepare a color conversion film.

Comparative Example 2

A color conversion film without using a phase change material was prepared in the same manner as in Example 1 except that the phase change material was not used.

Light emission spectrum of each of the color conversion films prepared according to Example 1 and Comparative Example 2 was measured using a spectroradiometer (SR series of TOPCON Corporation). Specifically, the prepared color conversion film was laminated on one surface of a light guide plate of a backlight unit including an LED blue backlight (maximum light emission wavelength 450 nm) and the light guide plate, and after laminating a prism sheet and a DBEF film on the color conversion film, a brightness spectrum of the film was measured, and the results are shown in FIG. 5. In addition, results of measuring brightness and quantum efficiency (QY) of each of the color conversion films are shown in the following Table 1. According to FIG. 5 and Table 1, it was identified that optical properties did not decline much even when introducing the phase change material to the color conversion film.

TABLE 1

|  | Comparative Example 2 | Example 1 |
| --- | --- | --- |
| Relative brightness | 100% | 86.4% |
| Quantum Efficiency | 0.95 | 0.81 |

For each of the color conversion films prepared according to the examples and the comparative examples, repeated driving durability was evaluated. Specifically, the prepared color conversion film was laminated on one surface of a light guide plate of a backlight unit including an LED blue backlight (maximum light emission wavelength 450 nm) and the light guide plate, and a prism sheet, a DBEF film and a reflecting plate were laminated on the color conversion film. In order to simulate a situation of heat generation caused by display driving, the laminated structure was placed on a hot plate and heated to 60° C., and a cycle of driving the backlight for 24 hours, cooling to room temperature for 24 hours and blocking the backlight was repeated 10 times. After each cycle, light emission spectrum of the color conversion film was measured using a spectroradiometer to analyze changes in the optical properties, and the results are shown in FIG. 6 and Table 2. In the color conversion film prepared according to Comparative Example 1, the phase change material was liquefied and flowed out of the color conversion film during the first driving, and further driving durability evaluation was not able to be progressed, whereas the color conversion film prepared according to Example 1 exhibited enhanced durability without separate leakages despite the high phase change material content.

TABLE 2

| Optical properties after 10 Times of Repeated Driving | Brightness % Compared to Initial Brightness |
| --- | --- |
| Example 1 | 99.8% |
| Example 2 | 98.0% |
| Comparative Example 1 | — |
| Comparative Example 2 | 93.5% |

The invention claimed is:

1. A color conversion film comprising:
 a substrate film;
 a color conversion layer provided on the substrate film; and
 a phase transformation adhesive layer provided on the color conversion layer,
 wherein the phase transformation adhesive layer includes an adhesive resin matrix and a phase change material; and
 the phase change material is at least one material selected from an organic monomer, a polymer and an inorganic salt hydrate.

2. The color conversion film of claim 1, wherein the phase change material has a solid-liquid phase transition occurring at 30° C. to 80° C.

3. The color conversion film of claim 1, wherein a content of the phase change material is from 10 parts by weight to 80 parts by weight with respect to 100 parts by weight of the phase transformation adhesive layer.

4. The color conversion film of claim 1, wherein the phase change material has a microcapsule structure having a shell and a core.

5. The color conversion film of claim 4, wherein the shell is at least one material selected from an urea-formaldehyde, a melamine-formaldehyde, a polyurethane resin, a polyurea resin, an epoxy resin, a gelatin and a polyacrylic resin; and the core is at least one material selected from an organic monomer, a polymer and an inorganic salt hydrate.

6. The color conversion film of claim 1, wherein the organic monomer is at least one compound selected from a paraffin-based compound, a fatty acid-based compound, an alcohol-based compound and a carbonate-based compound.

7. The color conversion film of claim 1, wherein the polymer is at least one selected from poly(ethylene glycol), poly(propylene oxide (PPO) and polytetrahydrofuran (PTHF).

8. The color conversion film of claim 1, wherein the inorganic salt hydrate is at least one material selected from $LiNO_3.3H_2O$, $Na_2SO_4.10H_2O$, $NaCH_3COO.3H_2O$, $CaBr_2.6H_2O$, $Na_2HPO_4.12H_2O$, $Zn(NO_3)_2.nH_2O$, $Na_2S_2O_3.5H_2O$ and $Cd(NO_3)_2.4H_2O$.

9. The color conversion film of claim 1, wherein the adhesive resin matrix is a cation polymerizable adhesive component, a radical curable adhesive component, or a mixture thereof.

10. The color conversion film of claim 1, further comprising a protective film on the phase transformation adhesive layer.

11. The color conversion film of claim 1, wherein the color conversion layer includes an organic fluorescent dye, and the organic fluorescent dye includes any one or more of BODIPY-based, acridine-based, xanthene-based, arylmethane-based, coumarin-based, polycyclic aromatic hydrocarbon-based, polycyclic hetero aromatic-based, perylene-based, pyrrole-based and pyrene-based derivatives.

12. A method for preparing a color conversion film, the method comprising:
 providing a substrate film;
 forming a color conversion layer on the substrate film; and
 forming a phase transformation adhesive layer including an adhesive resin matrix and a phase change material on the color conversion layer,
 wherein the phase change material is at least one material selected from an organic monomer, a polymer and an inorganic salt hydrate.

13. The method for preparing a color conversion film of claim 12, wherein the forming of a color conversion layer includes,
 mixing a resin, a solvent and an organic fluorescent dye to prepare a resin solution;
 coating the resin solution on the substrate film to form a color conversion layer; and
 drying the color conversion layer coated on the substrate film.

14. The method for preparing a color conversion film of claim 12, wherein the forming of a phase transformation adhesive layer includes,
 coating a phase change solution including an adhesive resin matrix, a solvent and a phase change material on the color conversion layer; and thermally curing or photocuring the phase transformation adhesive layer to form the phase transformation adhesive layer.

15. A backlight unit comprising the color conversion film of claim 1.

16. A display apparatus comprising the backlight unit of claim 15.

* * * * *